Aug. 13, 1929.  S. R. HOWARD  1,724,591
WEIGHING MACHINE
Filed Nov. 27, 1925    4 Sheets-Sheet 1

Inventor
Stanley R. Howard
by J. Stanley Churchill
his Atty

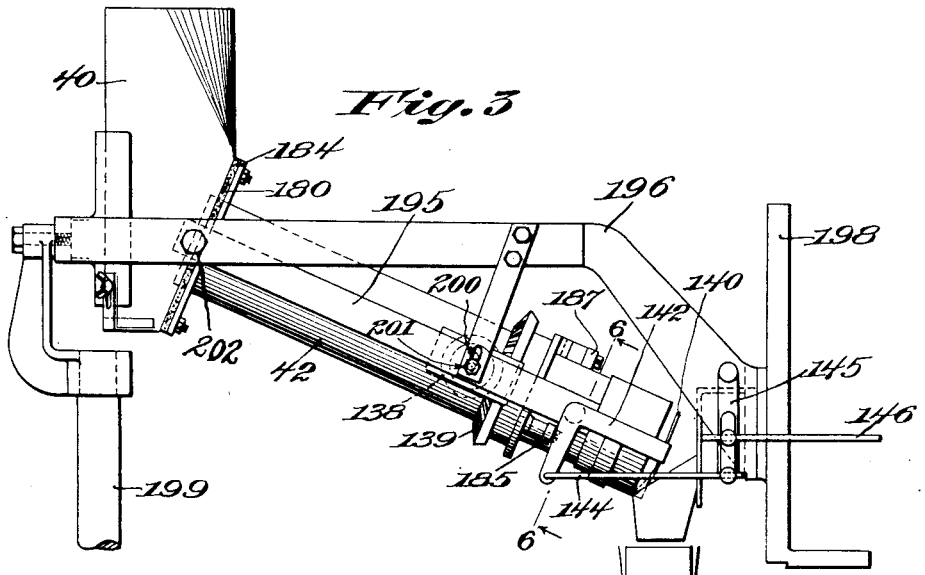
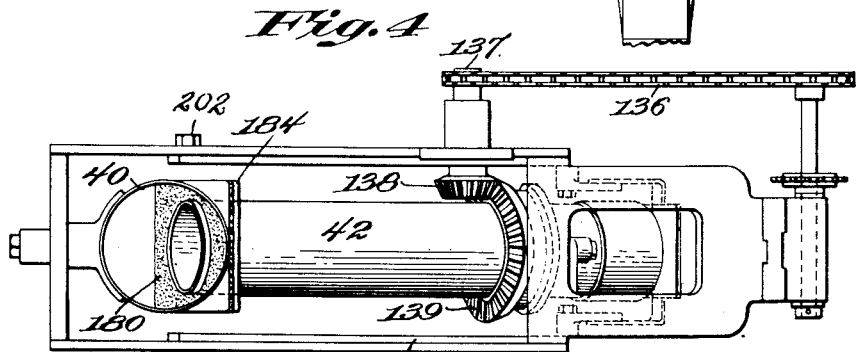
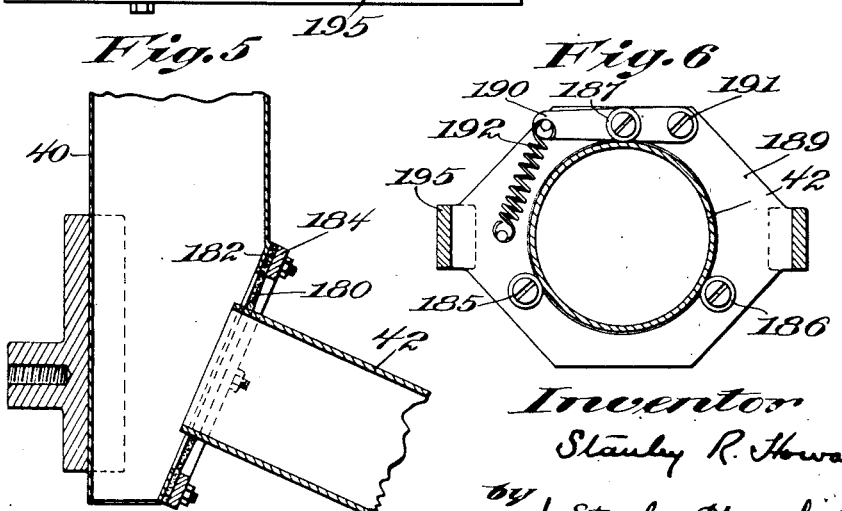

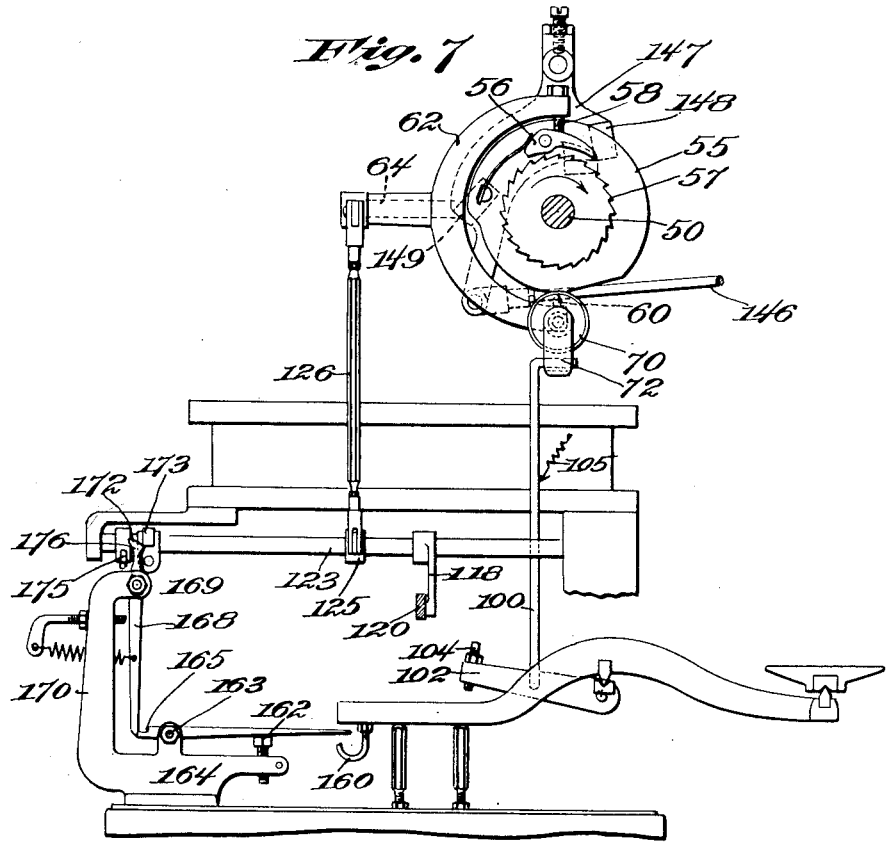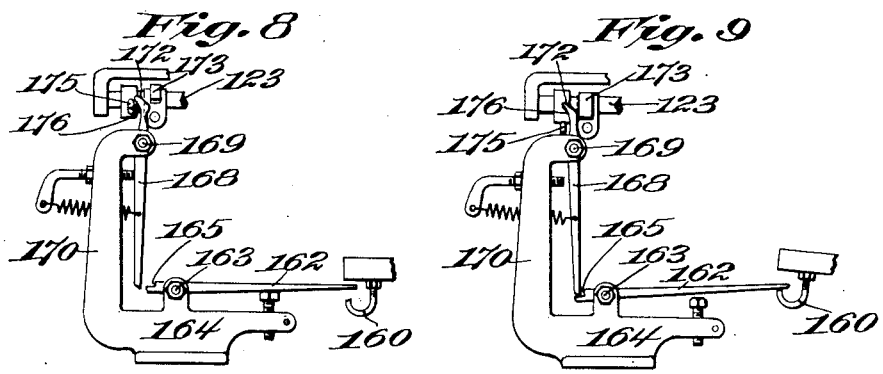

Aug. 13, 1929.   S. R. HOWARD   1,724,591
WEIGHING MACHINE
Filed Nov. 27, 1925   4 Sheets-Sheet 4

Inventor
Stanley R. Howard
by J. Stanley Churchill
his Atty.

Patented Aug. 13, 1929.

1,724,591

UNITED STATES PATENT OFFICE.

STANLEY R. HOWARD, OF EAST MILTON, MASSACHUSETTS, ASSIGNOR TO PNEUMATIC SCALE CORPORATION, LIMITED, OF QUINCY, MASSACHUSETTS, A CORPORATION OF MASSACHUSETTS.

WEIGHING MACHINE.

Application filed November 27, 1925. Serial No. 71,555.

This invention relates to a packaging machine, and more particularly to a weighing machine.

The invention has for one object to provide a novel and improved construction of weighing machine, and particularly an automatic weighing machine, which is not only adapted for general use but is also particularly designed for use in weighing into receptacles those goods, such as cornflakes and other bulky material, which are not of a freely flowing nature.

A further object of the invention is to provide a novel packaging machine which may be used with advantage to fill packages and other containers with materials which are not of a freely flowing nature.

To this end the invention consists in the weighing and packaging machines and in the structures, combinations and arrangements of parts hereinafter described and particularly pointed out in the claims at the end of this specification.

Figure 1:
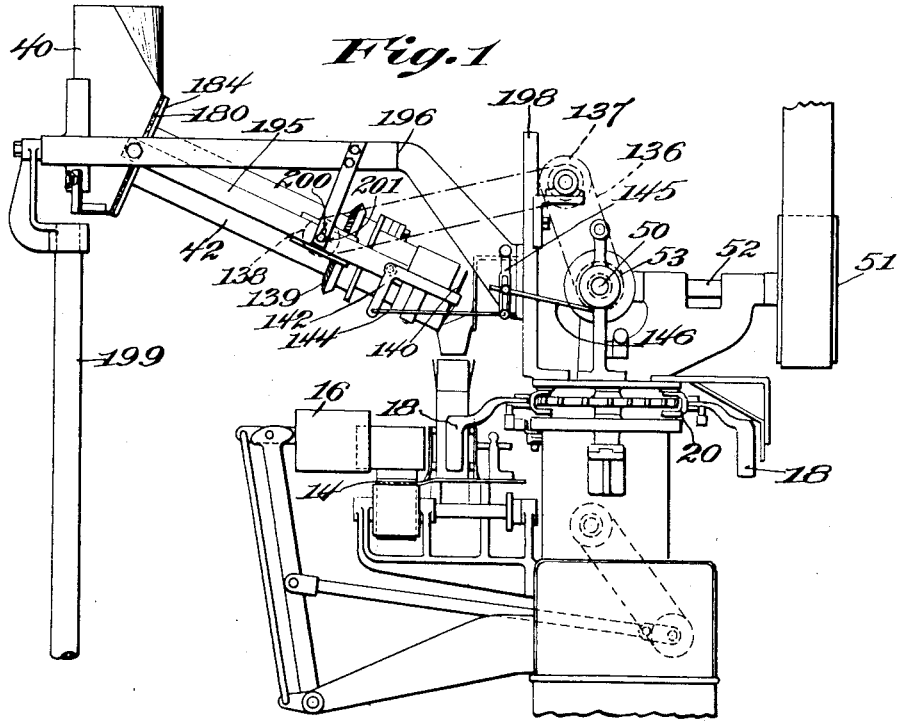
Figure 2:
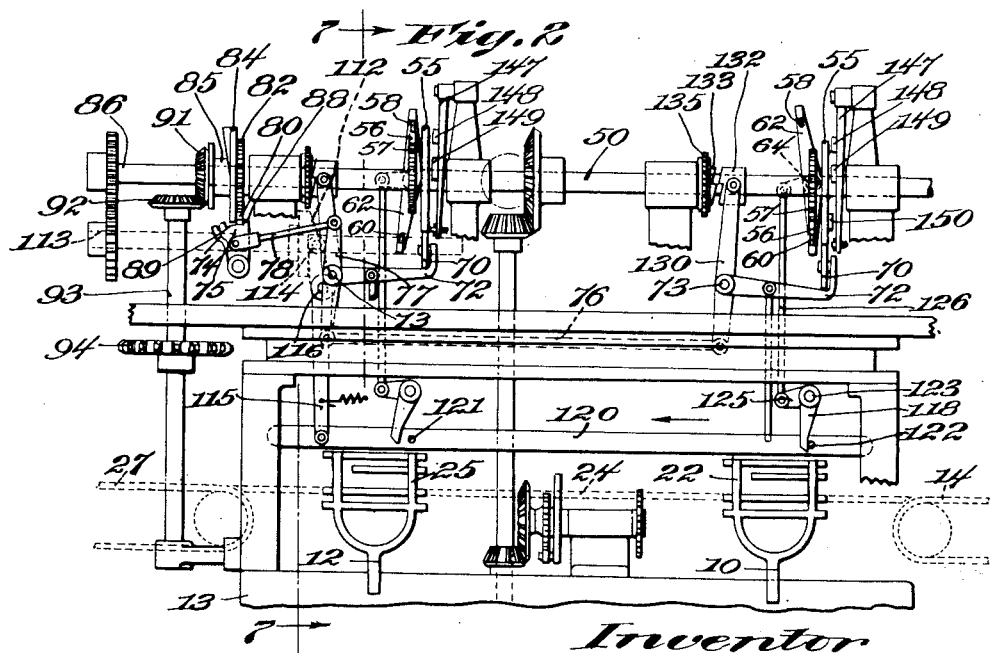
Figure 10:
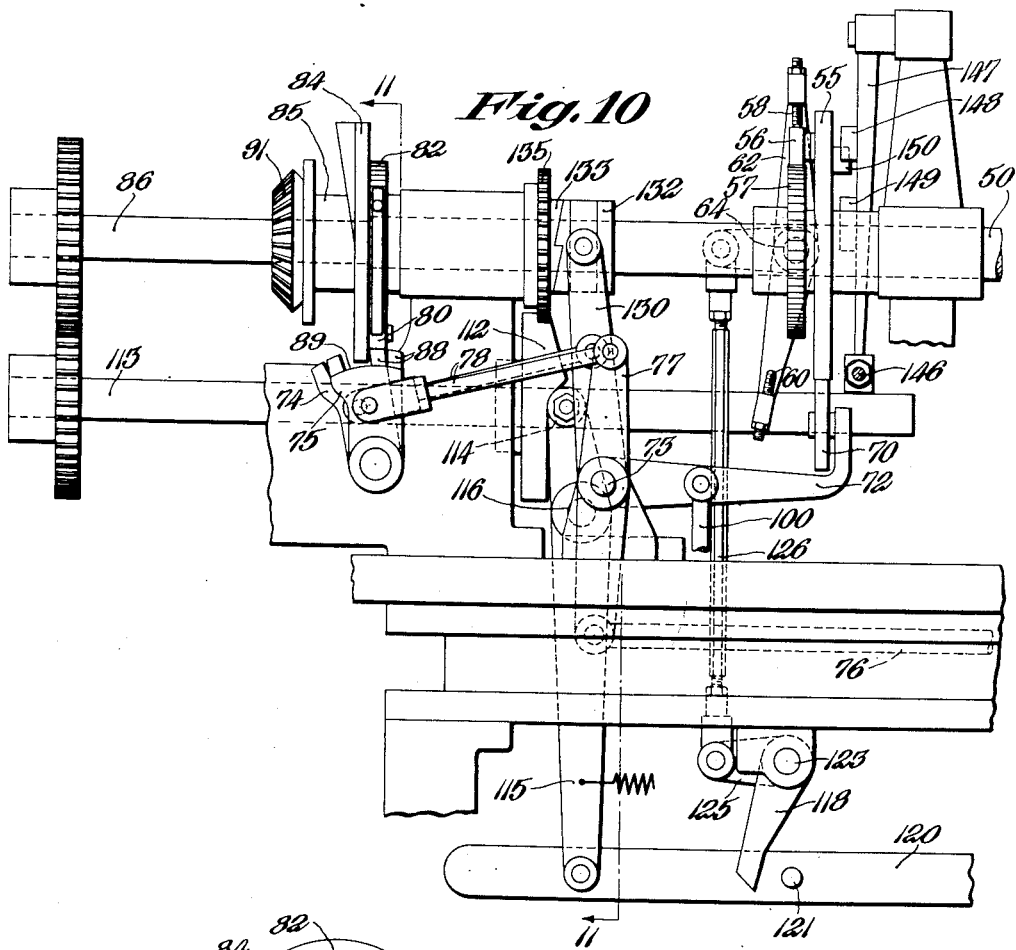
Figure 11:
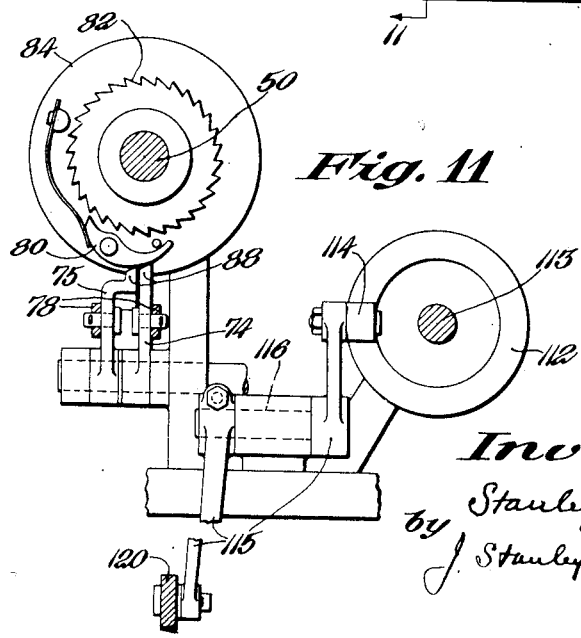

In the drawings illustrating the preferred embodiment of the invention, Figure 1 represents in side elevation a sufficient portion of the machine to enable the invention to be understood; Fig. 2 is a front view of a portion of the machine illustrated in Fig. 1; Fig. 3 is an enlarged detail in side elevation of the rotatable dispensing tube and associated parts; Fig. 4 is a plan view of the portion shown in Fig. 3; Fig. 5 is an enlarged vertical sectional detail of the hopper and the upper part of the dispensing tube; Fig. 6 is a sectional view taken on the line 6—6 of Fig. 3; Fig. 7 is a detail in section taken on the line 7—7 of Fig. 2; Figs. 8 and 9 illustrate in side elevation the scale controlling mechanism in different positions of operation; Fig. 10 is an enlarged view of the left hand portion of the mechanism illustrated in Fig. 2; and Fig. 11 is a sectional detail illustrating the pawl and ratchet clutch and associated parts forming part of the mechanism for controlling the operation of the machine.

The existing constructions of automatic weighing machines have not, in practice, proven adapted for the most successful handling and feeding of certain materials which are bulky in nature, which flow with difficulty, and of which class of materials cornflakes may be taken as illustrative. The goods of this character do not flow freely through the ordinary constructions of feeding devices, and as a result it has been found to be difficult to obtain precision in weighing.

In accordance with one feature of the present invention, the weighing machine is provided with a rotatable inclined feeding device, comprising a tube preferably circular in section, through which the goods are caused to pass by the combined effect of gravity and the rotation of the tube, and provision is made for controlling the rotation of such feeding device in accordance with the operation of the weighing mechanism. In the preferred form of the invention the weighing machine is provided with two scales, one for weighing an approximate or primary load, and the other for weighing the finished load. The rotary feeding device is operatively connected with the weighing mechanism, whereby the feeding device is started in rotation and stopped from rotation at predetermined times in the cycle of operation of the machine, and preferably when the packages have been moved upon the scale beams and the weighing operation is about to be started, and is stopped when the weighing operation is finished. Provision is also made for controlling the rotation of the rotary feeding device and also the flow of goods from the same, whereby neither the rotation of the feeding device, nor the flow of goods for a succeeding cycle, can commence until after the two scales have completed their weights in the previous cycle of operation of the machine.

Referring to the drawings, the different features of the invention are illustrated as embodied in a two-scale weighing machine of the general construction and having the general mode of operation, except as hereinafter pointed out, as the weighing machine disclosed in the patent to W. S. Scales, No. 924,191, to which reference may be made.

In general, and as herein shown, the weighing machine includes two scale beams 10, 12 mounted in the machine frame 13 in operative position with relation to an incoming conveyor belt 14 upon which successive empty packages or receptacles may be fed into a position to permit a package pusher 16 to push the packages successively into the path of fingers 18 upon a horizontally arranged endless conveyor 20, see Fig. 1. The fingers 18 are intermittently moved by the conveyor 20 to advance the packages step by step, first onto the scale pan 22 of the primary scale beam 10, where during the operation of the machine the package receives its primary weight or load, and then the package with its primary weight or load is moved on the track 24 by said fingers 18 into position upon the scale pan 25 of the finished weight scale beam 12. After receiving its final weight the package is moved by the fingers 18 onto an outgoing conveyor belt 27. During each cycle of operation of the weighing machine, either scale beam 10, 12 may operate independently of the other, but provision is made, as will be described, for preventing the operation of the conveyor 20 and the flow of the goods on the next cycle of operation, until both scale beams have completed their weights.

The material such as cornflakes is fed from a bulk supply into each of two hoppers 40, one of which is shown in Fig. 1, and thence down each of two inclined rotary tubes 42 comprising a rotary feeding device. The flow of the goods from the tubes is actuated by the combined effect of the rotation of the tube and by gravity and the flow is controlled both by stopping and starting the rotation of the tubes 42 and by opening and closing shutters, and as has been stated, provision is made for operatively connecting the mechanism for rotating the tubes and for opening and closing the shutters with the weighing mechanism.

Referring now to Figs. 1 and 2, the weighing machine operates in successive cycles, and in each cycle of operation of the weighing machine, during the first half of the cycle the weighing operations are permitted to take place, and after the weights on both of the scales have been reached, then the conveying mechanism is actuated to move the packages during the remaining half of the cycle. The operation of the machine with respect to the rotation of the rotary feeding tubes 42, the opening and closing of the shutters controlling the flow of goods, and the locking and unlocking of the scale beams, is effected by mechanism which may be described as follows: The machine is provided with a control shaft 50 driven continuously from a driving pulley 51 through a counter-shaft 52 and suitable gearing connections 53. Mounted upon the control shaft 50 are two cam members 55 loose upon the shaft, and each of which has pivotally mounted on one face thereof, a pawl 56 the nose of which is spring-pressed to be urged into engagement with the teeth of a ratchet wheel 57 fast upon said shaft. Each pawl 56 and ratchet 57 comprise a clutch for driving the cams 55 controlling the various operations of the machine as will be described. Each of the pawls 56 is disengaged from the teeth of its ratchet 57 by either of two pins 58, 60 mounted in each of two yokes 62, each yoke being pivoted upon a shaft 64 secured to the machine frame. Each yoke 62 is oscillated, as will be described, in a direction longitudinally of the main control shaft 50 to present either the upper or lower pin 58, 60 upon each yoke 62 in the path of the corresponding pawl 56 of the pawl and ratchet clutches. As above stated, when the yokes 62 are rocked counter clockwise, viewing Fig. 2, to move the upper pins 58 out of the paths of the pawls 56, then the spring operates to cause the nose of each pawl 56 to engage the teeth of its ratchet 57, and the ratchets operate to drive, through the pawls 56, the cam disks 55 through one half a revolution. When the yokes 62 are rocked counter clockwise, viewing Fig. 2, the lower pin 60 of each yoke is positioned in the path of its pawl 56, so that at the end of the half revolution of the cam disks 55, each pawl 56 is disengaged from its ratchet 57 and remains disengaged until the lower pins 60 are moved out of the path of the pawl when the yokes are rocked in the reverse direction, as will be described.

Mechanism is provided for controlling the machine so that it will not start upon the second half of its cycle of operation until both scales have completed their weights. For this purpose each cam disk 55 has cooperating with it, a cam roller 70 upon the end of an arm 72 pivoted upon a rock shaft 73. Both arms 72 are directly connected to each of two pawl controlling latches 74, 75, one of the arms 72 being connected thereto through a linkage 76. arm 77 and link 78, and the other being connected by a duplicate arm 77 and link 78. Both pawl controlling latches 74, 75 are arranged to cooperate with a single pawl 80 of a pawl and ratchet clutch, the ratchet 82 being fast upon the shaft 50, and the pawl 80 mounted upon the pawl carrying disk 84 upon a hub 85 secured to a separate shaft 86 supported by a suitable end bearing, (not shown) which is arranged to be driven from the shaft 50 through the pawl and ratchet clutch 80, 82. The pawl controlling latches 74, 75 are designed so that each is provided with a pawl engaging portion 88 for holding the pawl out of engagement with the ratchet, and with a recessed portion 89 adapted to permit the free rotation of the pawl without disengagement from the ratchet. When both pawl controlling latches 74, 75 are swung to the right and into an aligned position, viewing Fig. 2, the pawl and ratchet clutch 80, 82 is permitted to remain in engagement and hence to drive the shaft 86 from the shaft 50. The shaft 86 is connected by beveled gears 91, 92 to a vertical shaft 93 upon which is mounted the sprocket 94 for driving the package conveying chain 20, and consequently the movements of the packages at the start of the second half of each cycle of operation of the machine cannot take place unless the pawl controlling latches 74, 75 are in their inoperative position, or, in other words, are swung to the extreme position to the right, viewing Fig. 2, to permit the pawl 80 to remain in engagement with its ratchet 82. This condition, as will be described, only obtains when both scale beams 10, 12 have completed their weights and have been reset.

During the portion of each cycle of operation of the machine in which the packages are being moved onto the scale pans, the scale beams 10, 12 are locked by set screws 104 on levers 102, the latter being held down by the cams 55 through the rollers 70 and links 100, see Fig. 7. After the packages have been positioned, the set screws 104 and levers 102 are raised by springs 105 to unlock the scale beams preparatory to the start of the weighing operation.

As above stated, the operation of the weighing machine takes place in successive half cycles in which each cam disk 55 is permitted to make a half revolution accordingly as the pins 58, 60 upon the yokes 62 are moved to successively engage the tails of the pawls 56 as the yokes are rocked into their two positions of operation. The movement of the packages by the conveyor 20 occurs during one half of each cycle and the weighing operation occurs during the remaining half of each cycle. Both scales may operate to perform the weighing operation independently of each other, but as above stated, provision is made whereby the operation of the endless conveyor 20 to advance succeeding packages upon the scales, and to remove the weighed packages, is deferred until both scales have completed their weights. The yokes 62 are rocked clockwise to remove the lower pins 60 from engagement with the tails of the pawls 56 at the end of the half cycle of operation during which the packages have been moved by the conveyor 20. This rocking of the yokes 62 in a clockwise direction is effected by a cam 112 on a counter shaft 113, the latter being connected through spur gears to the shaft 86, see Fig. 2. A cam roller 114 is arranged to cooperate with the cam 112 and is mounted upon the upper arm of a lever 115 pivoted upon a shaft 116, the lower end of the lever 115 being connected to a slide bar 120 having two pins 121, 122 projecting therefrom and which are adapted when the slide bar is moved in the direction of the arrow, Fig. 2, by the cam 112, to rock the yokes 62, through linkage including levers 118 and shafts 123, and through second levers 125 connected by links 126 to the yokes 62, to the right or in a clockwise direction.

The movement of the yokes 62 to the right or in a clockwise direction under the influence of the cam 112, is permitted to take place only when both scale beams have completed their weights during the previous half cycle of operation, and assuming that both scale beams have completed their weights in this manner, the pawl controlling latches 74, 75 will have been moved as above described into their extreme position to the right, viewing Fig. 2, permitting the pawl and ratchet clutch 80, 82 to remain in engagement, and consequently permitting the shaft 86 to be rotated a half a revolution in the manner above described. In the event that either scale beam has not completed its weight, then the corresponding one of the pawl controlling latches 74, 75 remains in a position such that the pawl engaging portion 88 thereof remains in the path of the pawl 80 and holds the pawl and ratchet clutch 80, 82 disengaged, and thereby prevents rotation of the shaft 86 and consequently of the cam 112. The cam 112 is timed to operate at near the end of the travel of the packages under the actuation of the guide fingers 18 upon the sprocket chain 20, whereby when the packages have been moved on to the scale pans, the yokes 62 are rocked in a clockwise direction by the cam 112 through the linkage and connections just described, the pawl 56 and the cam disk 55 are rotated up into the position shown in Fig. 7, thus permitting the cam roller 70 to be raised by the operation of the coil spring 105, and causing levers 130 mounted upon the shaft 73 to be swung to the left, as will be obvious from an inspection of Fig. 2. Mounted upon the upper end of the levers 130 are movable members 132 of clutches, the driven members 133 of which are formed on the hubs of the sprockets 135, whereby the sprockets 135 are rotated by the shaft 50. The rotations of the sprockets 135 are transmitted through chains 136 and sprockets 137, see Fig. 4, to beveled gears 138 which cooperate with beveled gears 139 upon the rotary feeding tubes 42, as shown in Fig. 4. When, therefore, the clutches 132, 133 are engaged, the tubes 42 are caused to rotate to assist in the flow of the goods therefrom, and as has been stated, this takes place when either or both of the yokes 62 are rocked in a clockwise direction, viewing Fig. 2, and the rotation is prevented from taking place unless at the end of the previous half cycle of operation of the machine, both scales have completed their weights and the pawl controlling latches 74, 75 are in their inoperative position or their right-hand position, viewing Fig. 2.

Each rotary feeding tube 42 is provided with a shutter 140 for cutting off the flow of goods from the tube, and provision is made for opening and closing each shutter 140 at the start and end of the weighing operation. As herein shown, each shutter 140 is pivoted upon an arm 142 of a bell crank connected by a link 144 with a lever 145, the latter being connected by a link 146 to a pivoted bracket 147 provided with two blocks 148, 149 adapted to be contacted by a block 150 upon the face of each cam disk 55 and to be rocked back and forth by engagement of the block 150 with first one block 148 and then the other 149, as will be apparent from inspection of Figs. 1 and 7. It will also be observed that when the yokes 62 are rocked in a clockwise direction, as above described, and the rotary tubes 42, or either of them, are started in rotation, the rotation of the cam disks 55 at such time causes the shutters 140, or either of them, to be opened, and similarly when the yokes are rocked in the reverse direction, the rotation of the tubes 42 is stopped and the shutters 140 are closed. The arrangement is such that the movement of each shutter and the control of the rotation of its tube take place together.

When the scales have made their weights, the scale beams are depressed and provision is made for operatively connecting the scale beams with the yokes 62 in order to rock the yokes in a counter clockwise direction and to position the lower stop pins 60 in the path of the tail of the pawls 56 and at the same time to remove the upper pins 58 from engagement with the pawls to thereby permit the cam disks 55 to make one half a revolution, or in other words to start the machine on its next one half cycle of operation. As herein shown for this purpose the end of each scale beam is provided with a finger 160 which is adapted to engage the end of a counter-weighted lever 162 when the scale beams make their weight and to deflect the lever 162 into the position illustrated in Fig. 9. The lever 162 is pivoted at 163 in a bracket 164 secured to the machine frame, and the second end of the lever 162 is provided with a notched portion 165, adapted when the lever is deflected into the position of Fig. 9, to permit a latching lever 168 to swing into the position illustrated in Fig. 9. The lever 168 is pivoted at 169 in an arm at 170 formed as a part of the bracket 164. The upper end of the lever 168 is provided with a cam surface 172 which normally engages a cam block 173 fast upon the shaft 123, see Fig. 7, and the cam surface 172 is adapted to hold the cam block 173 in an elevated position and to thereby hold the shaft 123 in a position corresponding to the position of the yokes 62 in their extreme position to the right, or in other words, in the position into which they have been moved by the cam 112 at the end of the half cycle during which the packages have been moved upon the scale beams. When the shaft 123 is held by the cam 172 in an elevated position, the end of the lever 168 will engage the end of the lever 162, the parts being illustrated in this position in Fig. 7, and corresponding to the normal position of the scale beams at the start of the weighing operation. When the scale beams make their weight, the lever 162 is rocked into the position shown in Fig. 9 and the cam block 173 operated by the weights of the levers 125 and link 126 operates to cam the upper end of the lever 168 from the position shown in Fig. 7 to that shown in Fig. 9, thus permitting the shaft 123 to be rocked downwardly by the weight of parts 125, 126 and consequently to permit the yokes 62 to be rocked in a counter clockwise direction. After the scales have completed their weights, then inasmuch as the yokes 62 have been rocked into their extreme position to the left, viewing Fig. 2, the cam 112 will be rotated through the connections previously described and will operate through the slide bar 120 to rock the shaft 123 and again elevate the cam block 173 into the position shown in Fig. 7. When this occurs, a pin 175 engages the cam surface 176 on the under side of the upper end of the lever 168 and consequently swings the lever 168 to an intermediate position illustrated in Fig. 8, thereby permitting the lever 162 to assume a horizontal position, and thereafter as the surface of the cam 112 recedes slightly, to permit the cam block 173 to again engage the cam surface 172 and the parts to assume a reset position, such as is illustrated in Fig. 7, in which the end of the lever 168 engages the end of the lever 162 and in which the scale is ready for the succeeding weighing operation. The mechanism just described is referred to as the scale restting mechanism, and in the operation of the machine when each scale has thus been reset and is ready to weigh, the clutches 132, 133, are disengaged and remain disengaged until the slide bar 120 operates to rock, through the linkage described, the levers 130 and to cause the engagement of the clutches 132, 133, and consequently to initiate the rotation of the rotary tubes 42. The position of the cam blocks 148, 149 upon the lever 147 is arranged with respect to the cycle of operation of the machine, so that the cam block 150 operates to open the shutter when the tubes 42 are started in rotation in the manner just described.

Briefly the operation of the machine may be summarized as follows: Assuming that the machine is operating upon the half cycle in which the packages are being moved and that the scale beams are in a position ready to weigh and are locked by the levers 102, at this time the yokes 62 are in their extreme positions to the left, viewing Fig. 2, having been previously rocked in a counter-clockwise direction. Then when the shaft 113 has nearly completed its revolution, the cam 112 operates through the slide bar 120 and the connections described, to elevate the shaft 123. This rocks the yokes 62 in a clockwise direction (Fig. 2) and pulls the pins 60 out of the paths of the pawls 56 and permits the weighing half of the cycle to take place. As the cams 55 rotate through this one half cycle, the blocks 150 rock the blocks 149 and open the shutters 140 starting the flow of goods and the cams 55 also permit the rise of the cam roller 70, consequently operating to throw in the clutches 132, 133 and to cause the tubes 42 to rotate. The rise of the cam rollers 70 also operates to lift the levers 102 and to unlock the scale beams. The weighing operation continues until the scales make their weights, whereupon the scale beams trip the levers 162 (Figs. 7, 8 and 9) thereby permitting the weight of the levers 125 and links 126 to rock the yokes 62 in a reverse or counterclockwise direction permitting the second half cycle of the operation of the machine to take place, during which the scale beams are reset and locked and the tubes 42 stopped from rotation and the shutters 140 closed.

It will be observed that while each scale beam may operate to weigh independently of the other, it is necessary that both scale beams should have completed their weights before the next half cycle following the weighing operation is commenced, or in other words, before the yokes 62 are rocked clockwise in order to start the machine upon the next half cycle following the weighing operation.

Each of the rotary tubes 42 is preferably journaled at its upper end in a resilient pad 180 secured across and closing an opening in an inclined wall 182 of each hopper 40. The pad 180 is secured in place by a clamping plate 184 bolted to the hopper and is arranged to hug the surface of the tube and efficiently prevent leakage of the goods from the hopper around the rotating tube. Each tube 42 is also journaled near its lower end between three rollers 185, 186, 187, see Fig. 6, two of the rollers 185, 186 being secured upon a cross-piece 189 through which the tube 42 extends, and the roller 187 being mounted upon a lever 190 pivoted at 191 upon the cross-piece 189. A coiled spring 192 operates to yieldingly hold the roller 187 against the surface of the tube to thereby maintain the tube journaled between the three rollers and in a condition in which it may freely revolve. The cross piece 189 is formed as a part of a framework 195, the latter being secured to a bracket 196 bolted to an upright 198 of the main frame of the weighing machine and supported at its outer end by a standard 199 resting upon the floor.

The improved weighing machine is, as has been stated, particularly adapted for use in weighing those bulky materials which are not of a freely flowing nature, such as cornflakes and the like, and when the machine is used upon materials of different characteristics with respect to their flowing nature, it is desirable that provision be made for adjusting the inclination of each rotary tube 42 to the end that the angle of flow may be increased or decreased. For this purpose I have provided slots 200 in the straps by which the framework 195 is suspended from the bracket 196, and cap screws 201 are extended through the slots 200 and enable the framework 195 to be adjustably secured in different angular positions. The upper end of each tube 42 is pivotally secured by cap screws 202 to the bracket 196, as shown in Figs. 3 and 4, and the resilient pad 180 serves to maintain a tight joint between the hopper 40 and the tube 42 in the different positions of angular adjustment of the tube 42.

While the different features of the invention are preferably embodied in a weighing machine, it will be understood that certain features of the invention may with advantage be used in other packaging machines within the scope of the following claims.

Having thus described the invention, what is claimed is:—

1. In a weighing machine, in combination, a scale, means for moving packages onto and from said scale, mechanism for feeding the goods into a package on the scale including a rotary feeding conduit, and means for imparting a rotary motion to the conduit to assist the flow of goods therethrough, and means controlled by the scale for stopping the rotary movement of said conduit when the scale completes its weight.

2. In a weighing machine, in combination, a scale, means for moving packages onto and from the scale, mechanism for feeding the goods into a package on the scale including a rotary feeding conduit and means for imparting a rotary motion to the conduit to assist the flow of goods therethrough, and means for initiating and stopping the rotary movement of said conduit at the start and completion of the weighing operation.

3. In a weighing machine, in combination, a scale, means for moving successive packages onto and from the scale, mechanism for feeding the goods into a package while on the scale including a hopper, a rotatable elongated tube for receiving goods from the hopper and conveying them into the package upon the scale and means for rotating the tube, and means for initiating and stopping the rotation of said tube at the start and end of the weighing operation.

4. The combination with a rotary feeding conduit, of means for moving a package into operative position to receive goods fed by said conduit, and mechanism controlling the operation of the rotary conduit to start it in rotation when the package has been moved into package filling position, and to stop it from rotation when a predetermined amount of material has been delivered into the package.

5. The combination with a rotary feeding conduit, of means for moving a container into operative position to receive goods fed by said conduit, and mechanism controlling the operation of the rotary feeding conduit to start it in rotation when the container has been moved into container filling position, and to stop it from rotation when a predetermined amount of material has been delivered into the container.

6. In a packaging machine, in combination, package moving means, mechanism for feeding the goods including a rotary feeding conduit, and means for imparting rotary movement thereto to assist in the flow of the goods therethrough, mechanism for determining the amount of goods delivered into each package, and means controlled by the last mentioned mechanism for controlling the rotary movement of said conduit.

7. The combination with an elongated rotatable feeding tube, of means for moving a package into operative position to receive the goods fed by said tube, mechanism for starting the tube in rotation when the package has been moved into package filling position and for stopping it from rotation when a predetermined amount of material has been delivered into the package, a shutter for cutting off the flow of the goods from said tube, and mechanism for opening and closing the shutter at the start and end of the package filling operation.

8. In a weighing machine, in combination, a scale for weighing a primary load, a separate scale for weighing the finished load, said scales being capable of completing their weights independently of each other, a rotary feeding conduit for each scale, and means for initiating the rotation of each conduit at the start of each weighing operation, and for stopping the rotation of each device when its scale has completed its weight.

9. In a weighing machine, in combination, a scale for weighing a primary load, a separate scale for weighing the finished load, said scales being capable of completing their weights independently of each other, a rotary feeding device for each scale comprising an elongated rotary tube, means for initiating the rotation of each feeding device at the start of each weighing operation, a shutter for cutting off the flow of goods from each tube, means for opening the shutter at the start of each weighing operation, and means for closing the shutter and stopping the rotation of each tube when the corresponding scale has completed its weight.

10. In a weighing machine, in combination, a scale for weighing the primary load, a separate scale for weighing the finished load, said scales being capable of completing their weights independently of each other, a rotary feeding conduit for each scale, means for initiating the rotary movement of each conduit at the start of each weighing operation, and for stopping the rotation of each conduit when each scale has completed its weight, and means for preventing the initiation of rotation of either conduit until both scales have completed their weights upon the preceding cycle of operation.

11. The combination with two rotatable feeding conduits, of means for moving successive packages to present a package in operative position with relation to each conduit to receive goods fed by each conduit, mechanism for controlling the operation of the rotary conduit to start it in rotation when the package has been moved into package filling position and to stop it from rotation when a predetermined amount of material has been delivered into the package, and means for preventing the initiation of rotation of either conduit until predetermined amounts of material have been delivered into each package.

12. In a weighing machine, in combination, a scale, a rotary feeding conduit, a clutch controlling the rotation of said rotary feeding conduit, and means for disengaging the clutch when the scale makes its weight including a trip member adapted to be tripped when the scale makes its weight, a cam, connections between the trip member and cam for permitting rotation of the cam when the trip member is tripped, and connections between the cam and clutch for disengaging the clutch upon rotation of the cam.

13. In a weighing machine, in combination, a scale, a rotary feeding device, a shutter for cutting off the flow of the goods from said feeding device, a clutch controlling the rotation of the rotary feeding device, means for disengaging the clutch when the scale makes its weight including a trip member adapted to be tripped when the scale makes its weight, a cam, connections between the trip member and cam for permitting rotation of the cam when the trip member is tripped, connections between the cam and clutch for disengaging the clutch upon rotation of the cam, and means actuated by said cam for closing the shutter when the scale makes its weight.

In testimony whereof I have signed my name to this specification.

STANLEY R. HOWARD.